(12) United States Patent
Drechsel

(10) Patent No.: US 10,016,776 B2
(45) Date of Patent: Jul. 10, 2018

(54) ARTICULATED JOINT FOR SPRINKLERS

(71) Applicant: Arno Drechsel, Lienz (AT)

(72) Inventor: Arno Drechsel, Lienz (AT)

( * ) Notice: Subject to any disclaimer, the term of this patent is extended or adjusted under 35 U.S.C. 154(b) by 0 days.

(21) Appl. No.: 15/561,637

(22) PCT Filed: Apr. 7, 2016

(86) PCT No.: PCT/IB2016/051955
§ 371 (c)(1),
(2) Date: Sep. 26, 2017

(87) PCT Pub. No.: WO2016/162805
PCT Pub. Date: Oct. 13, 2016

(65) Prior Publication Data
US 2018/0071765 A1      Mar. 15, 2018

(30) Foreign Application Priority Data

Apr. 7, 2015    (IT) .................... 102015000010914

(51) Int. Cl.
*B05B 15/652*    (2018.01)
*B05B 15/68*    (2018.01)
(Continued)

(52) U.S. Cl.
CPC .......... *B05B 15/652* (2018.02); *B05B 15/066* (2013.01); *B05B 15/08* (2013.01);
(Continued)

(58) Field of Classification Search
CPC ......... B05B 15/06; B05B 15/65; B05B 15/60; B05B 15/62; B05B 15/652; B05B 15/68;
(Continued)

(56) References Cited

U.S. PATENT DOCUMENTS 1,774,320 A     8/1930   Cushing
2,240,392 A  *  4/1941   Dowell ................ B05B 15/652
                                                                         239/525

(Continued)

FOREIGN PATENT DOCUMENTS

EP         0185901       7/1986
WO      2006056849       6/2006

*Primary Examiner* — Alexander Valvis
*Assistant Examiner* — Christopher R Dandridge
(74) *Attorney, Agent, or Firm* — Themis Law

(57) ABSTRACT

An articulated connection joint between a liquid supply line and a sprinkler barrel includes a fixed tubular body to be connected to the supply line and a movable tubular body to be connected to the fixed tubular body and to the barrel. These bodies have end portions with equal curvature, one of which slidingly fits into the other one with a sealing element interposed therebetween. The tubular bodies, once coupled, define a common curvature plane and are hinged to each other about a transverse axis, which is substantially perpendicular to the curvature plane to provide for a relative inclination that can be adjusted with a plate-shaped member substantially parallel to the curvature plane and laterally secured to one of the bodies. A plurality of through holes in the plate-shaped member can receive a first pin fitted into a seat formed on the other body to selectively lock the inclination angle.

13 Claims, 4 Drawing Sheets

(51) Int. Cl.
*B05B 3/04* (2006.01)
*F16L 27/08* (2006.01)
*B05B 15/06* (2006.01)
*B05B 15/08* (2006.01)

(52) U.S. Cl.
CPC .......... *B05B 15/68* (2018.02); *F16L 27/0841* (2013.01); *F16L 27/0849* (2013.01); *B05B 3/0477* (2013.01)

(58) Field of Classification Search
CPC ..... B05B 15/066; B05B 15/08; B05B 3/0477; F16L 27/08; F16L 27/0849; F16L 27/12; F16L 27/0841; F16L 43/00; G02B 6/4461
USPC .................................................. 285/179, 184
See application file for complete search history.

(56) References Cited

U.S. PATENT DOCUMENTS

| | | | | |
|---|---|---|---|---|
| 4,421,279 A | * | 12/1983 | Drechsel | ............... B05B 15/652 |
| | | | | 239/546 |
| 4,652,017 A | * | 3/1987 | Drechsel | ................. F16L 27/12 |
| | | | | 285/184 |
| 7,051,952 B2 | * | 5/2006 | Drechsel | ................ A01G 25/09 |
| | | | | 239/230 |

\* cited by examiner

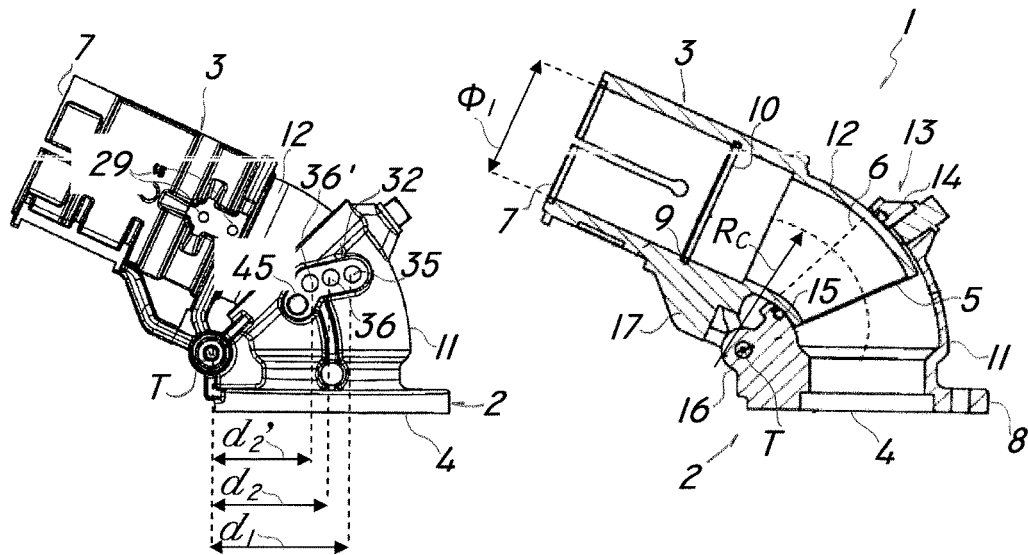
FIG. 3A  FIG. 3B
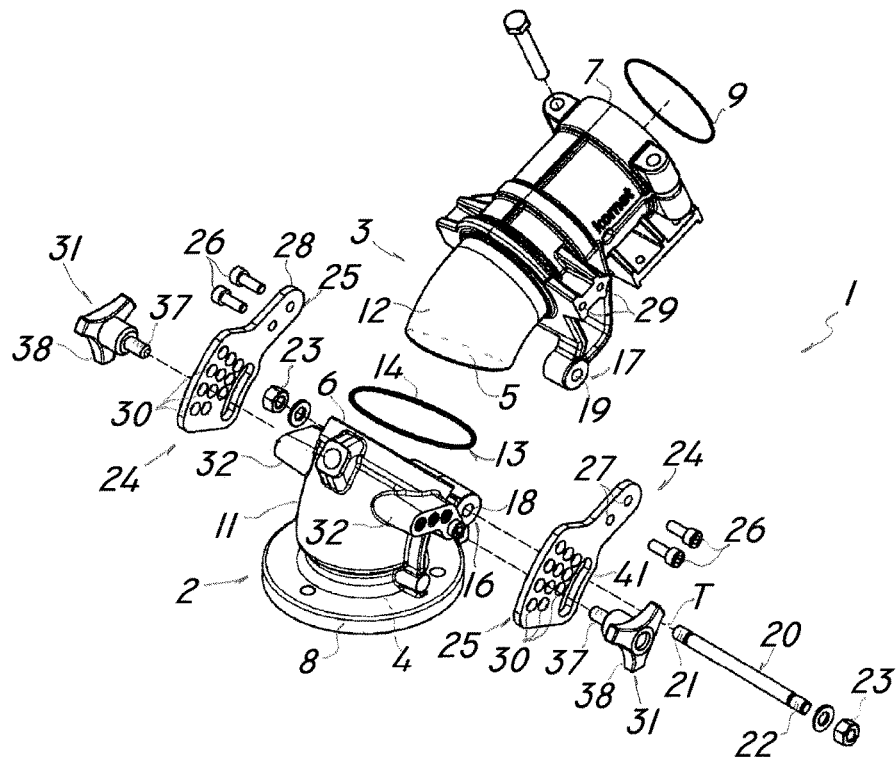
FIG. 4

ARTICULATED JOINT FOR SPRINKLERS

FIELD OF THE INVENTION

The present invention generally finds application in the field of irrigation systems for agricultural and industrial applications, and particularly relates to an articulated joint for nozzles for use in sprinkler systems.

BACKGROUND ART

Some prior art agricultural and/or industrial irrigation systems comprise a conduit for supplying an irrigation liquid, generally water, which is connected to a plurality of sprinkler devices for uniformly distributing a liquid jet to a soil portion to be irrigated.

Particularly, these sprinkler devices may be either stationary, to always irrigate the same soil portion, or movable relative to the supply conduit for substantially constant-speed sweeping of a given cultivated surface.

In view of improving jet orientation, articulated joints have been developed, which are interposed between the liquid supply conduit and the sprinkler device and are adapted to adjust the inclination angle of the jet relative to the ground.

Articulated joints can adapt jet distribution to current weather conditions, e.g. by compensating for any liquid deflection caused by the wind.

EP0544688, by the applicant hereof, discloses an articulated joint for irrigation system jets which comprises a first curved tubular body, adapted to be connected to the jet, and to slidingly fit into a second curved tubular body that is adapted to be secured to the liquid supply line. The relative inclination angle of the two bodies can be adjusted by the user by screwing/unscrewing a threaded shaft with respect to a pair of pins that are joined to the first and second tubular bodies respectively. Thus, by causing the shaft to be entirely screwed or unscrewed with respect to the pins such inclination angle may be continuously adjusted in a predetermined range from minimum to maximum values.

The main drawback of this solution is that the inclination of the tubular bodies of this joint may change with time, thereby causing an unexpected change in liquid distribution over the soil.

This is because the position of the threaded shaft may change due to pulling forces acting on the joint, as a result of vibrations or water hammers caused by the jet.

In an attempt to obviate this drawback, articulated joints have been developed which afford discrete adjustment of the inclination angle in a predetermined range from minimum to maximum values.

EP0185901, also of the applicant hereof, discloses an articulated joint having a pair of tubular elements sliding one into the other with respective mutually facing upper bored appendices. An arched slot is formed in one of the appendices, whereas the other appendix has a plurality of holes for receiving a screw. By introducing the screw into a given hole, the limits of the range of inclination angle adjustment for the jets relative to the ground may be discretely changed.

A first drawback of this arrangement is that this joint only affords discrete selection of the limits of the inclination angle adjustment range.

The intermediate inclination angle values shall still be adjusted manually by appropriate displacement of the slot and are thus still exposed to the risk of changing with time due to variations, water hammers and other impulsive forces that may be exerted on the sprinkler.

A further drawback of this arrangement is that the joint affords adjustment of the inclination angle in a limited range, generally not exceeding 25°.

Furthermore, the maximum inclination angle adjustment for each adjustment range is very small, not exceeding about 6°.

Another drawback of this arrangement is that the appendix of each tubular portion is placed on the upper portion of the joint, which will increase the overall dimensions and cause a higher risk of unexpected failures thereof, as a result of accidental impacts of the appendix against other parts of the irrigation system.

Furthermore, these joints have poor stability and durability, as the portions of the body that are designed to slide one unto the other are exposed to wear, thereby affecting fluid tightness and causing liquid leakage.

These impacts are very frequent during installation of the joint in the system.

Technical Problem

In light of the prior art, the technical problem addressed by the present invention consists in providing an articulated joint for sprinkler systems that allows the liquid jet to be inclined within a very wide angular range, and that can fix a precise angle therefor and keep it unchanged with time.

Disclosure of the Invention

The object of the present invention is to obviate the above drawbacks, by providing an articulated joint for sprinkler systems that is highly efficient and relatively cost-effective.

A particular object of the present invention is to provide an articulated joint for sprinkler systems that allows the jet to be inclined at a very precise inclination angle.

A particular object of the present invention is to provide an articulated joint for sprinkler systems that allows the jet to be inclined at an inclination angle that remains constant with time.

A particular object of the present invention is to provide an articulated joint for sprinkler systems that allows the jet to be inclined at an inclination angle that is particularly selected from a wide range of values.

A particular object of the present invention is to provide an articulated joint for sprinkler systems that has a compact size and high impact strength.

Another important object of the present invention is to provide an articulated joint for sprinkler system that is durable and ensures perfect liquid tightness under any operating condition.

These and other objects, as better explained hereafter, are fulfilled by an articulated joint for sprinkler systems as defined in claim 1.

Advantageous embodiments of the invention are obtained in accordance with the dependent claims.

BRIEF DESCRIPTION OF THE DRAWINGS

Further features and advantages of the invention will be more apparent from the detailed description of a preferred, non-exclusive embodiment of an articulated joint for sprinkler systems according to the invention, which is described as a non-limiting example with the help of the annexed drawings, in which:

FIGS. 3A and 3B are lateral and broken away lateral views of the joint of FIG. 1 respectively;

FIG. 4 is an exploded perspective view of the joint of FIG. 1;

DETAILED DESCRIPTION OF A PREFERRED EMBODIMENT

Figure 1:
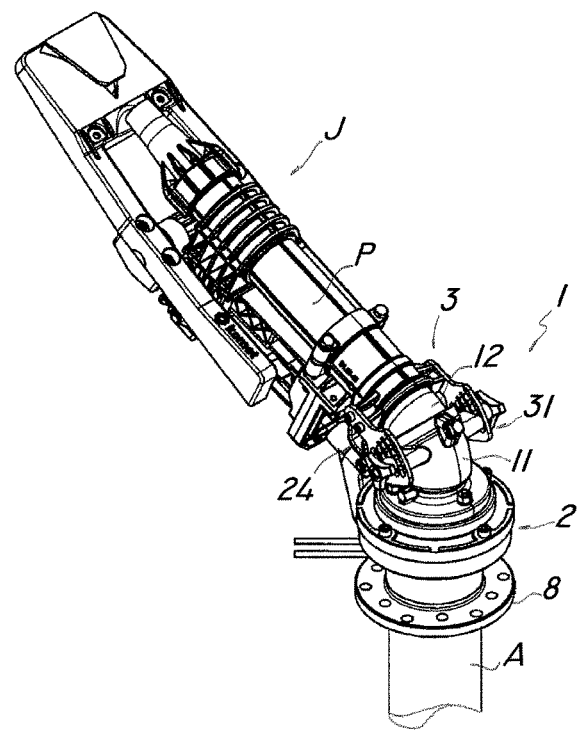
FIG. 1 is a perspective view of the end portion of a sprinkler system in which the articulated joint of the invention is shown to be connected to the fluid supply line and the jet barrel.

Particularly referring to FIG. 1, numeral 1 generally designates an articulated joint that can be applied and installed on a sprinkler J having a jet barrel P designed for uniformly spreading liquid over a predetermined area for irrigation or cooling.

Particularly, the liquid may be water and the sprinkler J may be either stationary or movable, e.g. of the "center pivot" type or the like.

The articulated joint 1 of the invention comprises a fixed tubular body 2, adapted to be connected to the liquid supply line A and a movable tubular body 3, adapted to be connected to the sprinkler J.

Figure 2A:
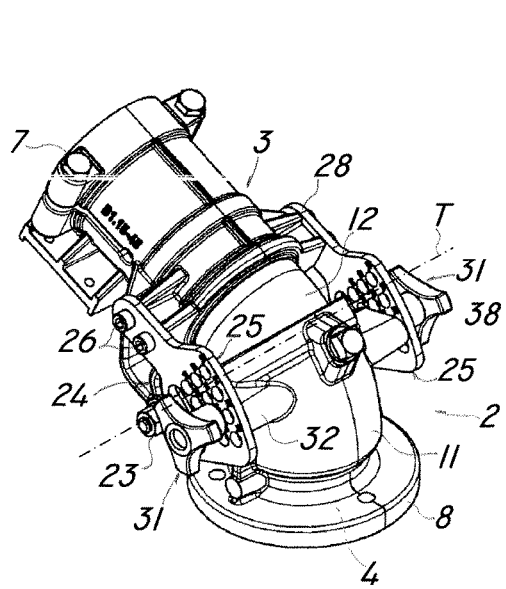
FIGS. 2A and 2B are perspective and rear views of the joint of FIG. 1 respectively.
Figure 2B:
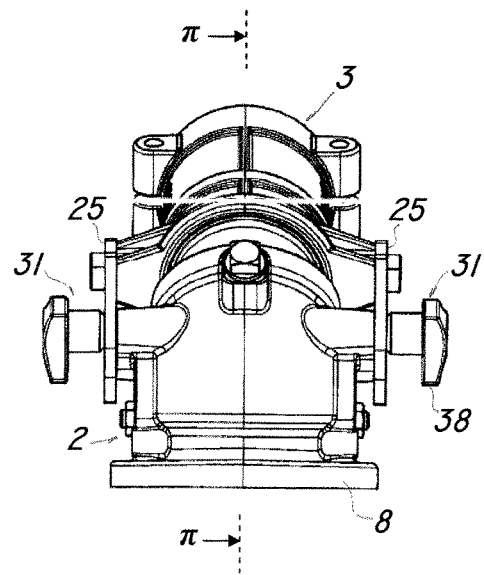

Each tubular body 2, 3 may have its respective liquid inlet 4, 5 and its respective liquid outlet 6, 7. As best shown in FIGS. 2 to 3B, the fixed tubular body 2 may have a circular flange 8 at its inlet, for connection to the tubular liquid supply line A.

On the other hand, the outlet 7 of the movable tubular body 3 may have a circular shape with a predetermined diameter $\phi_1$ selected to allow the barrel P of the sprinkler J to partially fit therein.

Furthermore, a first O-Ring 9 may be housed in a corresponding first annular seat 10 formed in the movable tubular body 3, to ensure liquid tightness once the barrel P has been inserted therein.

Conveniently, the tubular bodies 2, 3 may have at least one curved end portion 11, 12 respectively, and both have the same radius of curvature $R_C$ so that one of the two portions may slidingly be inserted into the other portion.

For instance, the radius of curvature $R_C$ of each tubular body 2, 3 may range from 70 mm to 80 mm.

In the configuration of the invention as shown in the figures, the end portion 12 of the movable body 3 slidingly fits into the corresponding end portion 11 of the fixed body 2.

Particularly, the two tubular bodies 2, 3 will be coupled by inserting the inlet 5 of the movable member 3 into the outlet 6 of the fixed member 2.

Seal means 13 for liquid tightness are also provided between the end portions 11, 12 of the tubular bodies 2, 3.

Particularly, as best shown in FIG. 3B, the seal means 13 may include a second O-Ring 14 housed in a corresponding second annular seat 15 formed proximate to the outlet 6 of the fixed tubular body 2.

Once the tubular bodies 2, 3 have been coupled together, they define a common curvature plane π and are reciprocally hinged about a transverse axis T substantially perpendicular to such curvature plane π.

Each tubular body 2, 3 may comprise a respective downwardly-extending appendix 16, 17, with a respective transverse passage 18, 19.

These transverse passages 18, 19 are designed for registration with an elongate shaft 20, extending along the transverse hinge axis T, to fit therein.

The shaft 20 may have threaded end portions 21, 22, which are adapted to project out of the appendices 16, 17 once the shaft has been fitted into the passages 18, 19, for a pair of stop nuts 23 to be screwed thereon.

The presence of the shaft 20 will allow the movable body 3 to rotate relative to the fixed body 2 about the transverse axis T to thereby change the relative inclination angle α of the bodies 2, 3 and, as a result, the liquid jet angle β relative to the horizontal.

Conveniently, the joint 1 has adjustment means 24 for adjusting the relative inclination angle α which, according to a peculiar aspect of the invention, comprise at least one plate-like member 25 substantially parallel to the curvature plane π and laterally secured to one of the tubular bodies 2, 3, as best shown in FIGS. 2, 4-5C and 7.

Particularly, the joint 1 may comprise a pair of plate-like members 25, placed at opposite sides with respect to the tubular bodies 2, 3, in symmetrical positions with respect to the common curvature plane π.

Each plate-like member 25 may be removably secured to the movable body 3 by means of one or more threaded screws 26 extending through respective fastening holes 27 formed at an end portion 28 of the plate-like member 25.

These screws 26 may be screwed down into corresponding matingly-threaded holes 29 formed in the movable body 3 on opposite sides and in symmetrical positions with respect to the common plane of curvature π.

The connection of the plate-like members 25 at the sides of the movable tubular body 3 can reduce the overall dimensions of the joint, by avoiding the presence of any projections or parts in its upper portion, which might be easily damaged during operation of the system I due to accidental impacts of objects against the joint.

Figure 7:
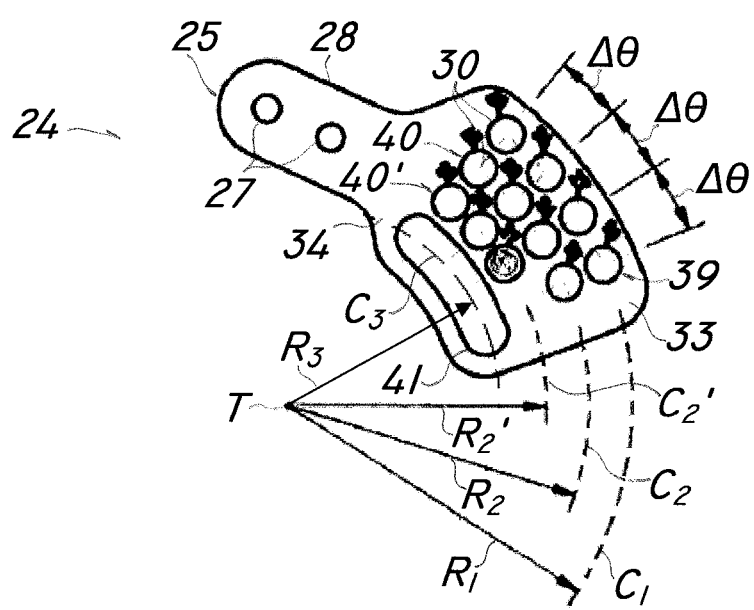
FIG. 7 is a lateral view of a first detail of FIG. 1.

Advantageously, as best shown in FIG. 7, each plate-like element 25 has a plurality of through holes 30 for receiving a respective first pin 31 that can be fitted into at least one seat 32 formed on the other tubular body 2 for selectively locking the relative inclination angle α.

The plate-like element 25 may have a wider portion 33 formed with the through holes, a narrower end portion 28 formed with the fastening holes 27 and a connecting portion 34 for joining the wider portion 33 and the narrower portion 28 together.

In the configuration of the invention as shown in figures, two seats 32 are formed in the fixed tubular body 2 on opposite sides and in symmetrical positions with respect to the common curvature plane π.

As well shown in FIGS. 2 & 4 a pair of first pins 31 are fitted into the through holes 30 of respective plate-like members 25.

Each of these seats 32, as shown in FIG. 3A, may have a plurality of blind holes 35, 36, 36' situated at a predetermined distance $d_1$, $d_2$, $d_2'$ from the transverse axis T, selected to promote alignment with a corresponding through hole 30 of the plate-like member 25 for the corresponding first pin 31 to fit therein.

The latter may comprise a cylindrical threaded portion 37, adapted to fit into a corresponding through hole 30 and be screwed onto respective mating threads formed on the blind holes 35, 36, 36'.

The first pin 31 may also comprise a knob-like portion 38, which is adapted to be grasped by the user to facilitate insertion or removal of the cylindrical portion 37 into and out of the seat 32 as well as to screw it into and out of the blind holes 35, 36, 36'.

In an alternative embodiment, not shown, the first pin 31 may comprise an intermediate threaded portion 37, which is designed to be screwed into a corresponding matingly-threaded through hole 30' formed in the plate 25 as well as an end portion, which is designed to fit into a respective seat defined by the blind holes 35, 36, 36'. Furthermore, the end portion of the first pin 31 and the blind holes 35, 36, 36' may be slightly tapered.

Due to the presence of the through holes 30 and the blind holes 35, 36, 36' the relative inclination angle α may be discretely changed in a predetermined range from respective minimum $\alpha_{min}$ and maximum $\alpha_{max}$ values, e.g. ranging from 0° to 40°.

This will also afford discrete changes of the inclination angle β of the movable tubular body 3 to the horizontal, which will change the liquid jet inclination out of the jet barrel P.

For example, the inclination angle β to the horizontal may have a minimum value $\beta_{min}$ of not less than 10° and a maximum value $\beta_{max}$ of not more than 50°.

Figure 5A:
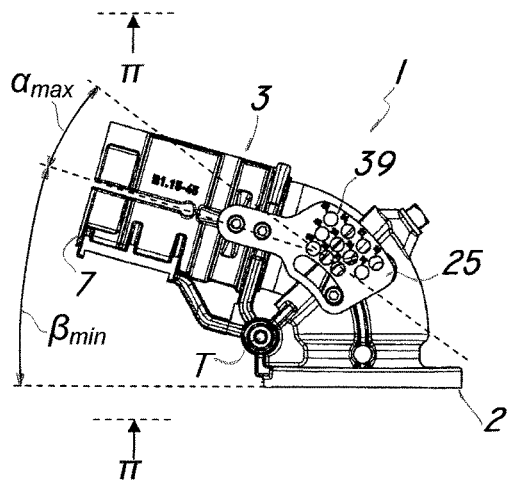
FIGS. 5A to 5C are lateral views of the joint of FIG. 1 in different operating positions.
Figure 5B:
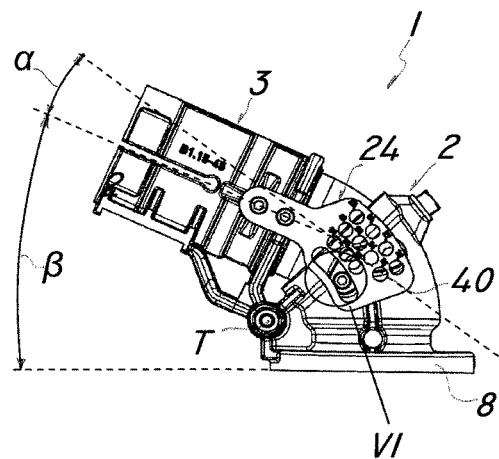
Figure 5C:
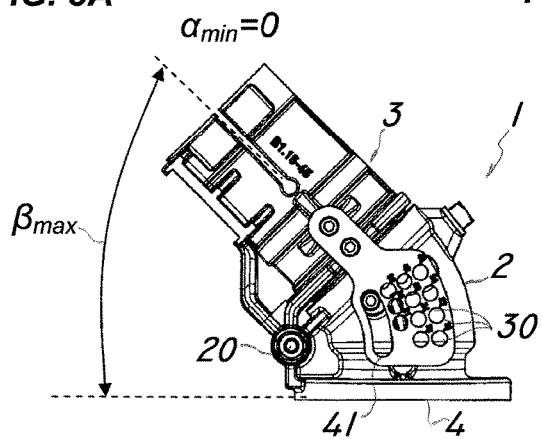

Nevertheless, this inclination angle β may be adjusted between a minimum value $\beta_{min}$ of about 15°, as shown in FIG. 5A, and a maximum value $\beta_{max}$ of about 45°, as shown in FIG. 5C.

Preferably, as best shown in FIG. 7, some of the through holes 30 of each plate-like member 25 may be arranged along a first row 39 extending along a first circular arc $C_1$ substantially concentric with the transverse axis T and having a first radius $R_1$ of predetermined value.

Conveniently, as mentioned above, a corresponding first blind hole is placed in the seat 32, at a distance $d_1$ from the transverse axis T which is equal to the value of the first radius $R_1$.

Therefore, the first blind hole 35 is in register with the through holes 30 of the first row 39 to define therewith a first discrete series of values of the relative inclination angle α.

The through holes 30 arranged along the first arc $C_1$ may be angularly offset by a substantially constant angular pitch Δθ of predetermined value.

For instance, the first radius $R_1$ may have a value of about 80 mm whereas the angular pitch Δθ may range from 6° to 12° and is preferably close to 9°.

When a first row 39 of four through holes 30 is formed and these values of the radius $R_1$ and the angular pitch Δθ are maintained, the inclination angle β of the movable body may be discretely adjusted relative to the horizontal between a lower limit value of about 18° and an upper limit value 45°.

Furthermore, the remaining through holes 30 of each plate-like member 25 may be arranged along additional rows 40, 40' extending along respective second circular arcs $C_2$, $C_2$' substantially concentric with the transverse axis T and having second radiuses $R_2$, $R_2$' of predetermined value.

Here again corresponding blind holes 36, 36' will be formed in the seat 32, whose distance from the transverse axis T is equal to the value of the second radiuses $R_2$, $R_2$'.

Thus, the blind holes 36, 36' will be in register with the holes 30 of these second rows 40, 40' to define e second discrete series of values of the relative inclination angle α.

Also, 39, in the same manner as the first row 39 described above, the holes 30 arranged along the second arcs $C_2$, $C_2$' may be spaced by an angular pitch Δθ ranging from 6° to 12°, preferably close to 9°.

In the preferred configuration of the invention as shown in the figures, a concentric pair of second circular arcs $C_2$, $C_2$' are provided, having corresponding second radiuses $R_2$, $R_2$' of about 60 mm and 70 mm.

Particularly, three through holes 30 are formed on the second arc $C_2$' having the smaller radius $R_2$', for adjustment of the inclination angle β relative to the horizontal within a discrete range of values from about 21° to about 32°.

On the other hand, four through holes 30 are arranged along the second arc $C_2$ with the greater radius $R_2$, for discrete adjustment of the inclination angle β relative to the horizontal between limit values of about 15° and about 42°.

Advantageously, as best shown in FIGS. 5A-5C and 7, an elongated hole 41 may be formed on each plate-like member 25, extending along a corresponding third circular arc $C_3$.

The third axis $C_3$ may be centered on the transverse axis T and may have a third radius $R_3$ smaller than the smaller second radius $R_2$'.

Also, the fixed tubular body 2 may comprise a pair of second pins 42 projecting from opposite sides and in symmetric positions with respect to the common curvature plane π.

These second pins 42 are located at a distance $d_3$ from the transverse axis T which is equal to the value of the third radius $R_3$ such that they may slidingly fit into the elongated holes 41.

Figure 6:
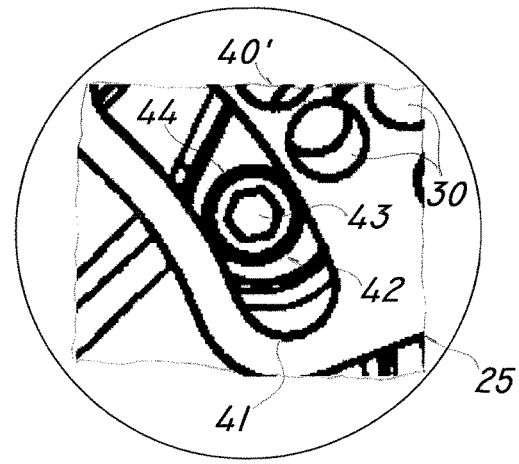
FIG. 6 is an enlarged view of a first detail of FIG. 5B.

As best shown in the enlarged view of FIG. 6, the second pins 42 consist of the enlarged head 43 of a bolt 44 which is screwed into a corresponding third blind hole 45 formed in the seats 32 of the fixed body 2, as shown in FIG. 3A.

Therefore, when the operator causes the tubular bodies 2, 3 to move relative to each other to select a given relative inclination angle α, the elongated holes 41 will slide on their respective pins 42 to guide the rotation of the movable tubular body 3.

Conveniently, the elongated holes 41 may have a predetermined length $l_1$ to allow the movable body 3 to freely rotate relative to the fixed body 2 between two limit positions corresponding to inclination angles relative to the horizontal β that are smaller than the minimum value $\beta_{min}$ and greater than the maximum value $\beta_{max}$.

Also, the presence of the elongated holes 41 and the second pins 42 will maintain the coupled state of the tubular bodies 2, 3 even when both pins 31 have been removed from their respective seats 32.

This will prevent mutual release of the tubular bodies 2, 3 once the operator has removed the pins 31 from their respective seats 32 to promote the rotation of the movable body 3 relative to the fixed body 2, in order to select a given relative inclination angle α.

The articulated joint of the invention is susceptible of a number of changes and variants, within the inventive concept disclosed in the appended claims. All the details thereof may be replaced by other technically equivalent parts, and the materials may vary depending on different needs, without departure from the scope of the invention.

While the articulated joint has been described with particular reference to the accompanying figures, the numerals referred to in the disclosure and claims are only used for the sake of a better intelligibility of the invention and shall not be intended to limit the claimed scope in any manner.

INDUSTRIAL APPLICABILITY

The present invention may find application in industry, because it can be produced on an industrial scale in factories in the field of irrigation, or for manufacturing sprinklers and parts for irrigation systems.

The invention claimed is:

1. An articulated joint for connection between a liquid supply line (A) and a jet barrel (P) of a sprinkler (J), the articulated joint (1) comprising:
   a fixed tubular body (2) adapted to be connected to the liquid supply line (A); and
   a movable tubular body (3) designed to be coupled to said fixed tubular body (2) and to be connected to the jet barrel (P) of the sprinkler (J);
   wherein each of said tubular bodies (2, 3) has at least one curved end portion (11, 12) having a same curvature for both bodies, the curved end portion (12) of one of said tubular bodies (3) being slidingly inserted into the curved end portion (11) of the other one of said tubular bodies (2) with a sealing element (13) interposed therebetween;
   wherein, once said tubular bodies (2, 3) have been coupled, said tubular bodies define a common curvature plane ($\pi$) and are reciprocally hinged about a transverse axis (T) that is substantially perpendicular to said curvature plane ($\pi$) to allow a relative inclination thereof, an adjustment system (24) being provided that adjusts a relative inclination angle ($\alpha$) between said tubular bodies (2, 3);
   wherein said adjustment system (24) comprises at least one plate-shaped member (25) substantially parallel to said curvature plane (it) and laterally secured to one of said tubular bodies (2, 3), said plate-shaped member (25) being provided with a plurality of through holes (30) for receiving a first pin (31) to be inserted into at least one seat (32) formed on the other one of said tubular bodies (3, 2) for selectively locking said relative inclination angle ($\alpha$); and
   wherein said plurality of holes (30) comprises a first row (39) of holes (30), which are evenly arranged along a first circular arc ($C_1$) substantially concentric with said transverse axis (T), and one or more second rows (40, 40') of holes (30) arranged along respective second circular arcs ($C_2, C_2'$), which are substantially concentric with and radially offset from the first circular arc ($C_1$), the holes (30) of said first row (39) being configured for registration with said seat (32) to define a first discrete series of relative inclination angle ($\alpha$) values, the holes (30) of said one or more second rows (40, 40') being adapted for registration with said seat (32) to define second discrete series of relative inclination angle ($\alpha$) values.

2. The articulated joint as claimed in claim 1, wherein said plate-shaped member (25) is laterally secured to said movable tubular body (3) and said at least one seat (32) is formed on said fixed tubular body (2).

3. The articulated joint as claimed in claim 1, wherein said first circular arc ($C_1$) has a first radius ($R_1$) of predetermined value and said second circular arcs ($C_2, C_2'$) have respective second radiuses ($R_2, R_2'$) having smaller values than said first radius ($R_1$).

4. The articulated joint as claimed in claim 1, wherein the holes (30) of each of said rows (39, 40, 40') are reciprocally angularly offset by substantially a same angular pitch ($\Delta\theta$) ranging from 6° to 12°.

5. The articulated joint as claimed in claim 3, wherein said at least one seat (32) comprises a plurality of blind holes (35; 36, 36') each located at a distance ($d_1, d_2, d_2'$) from said transverse axis (T) that is equal to the value of said first radius ($R_1$) and the values of said second radiuses ($R_2, R_2'$) respectively for registration with corresponding through holes (30) of said first row (39) or said second rows (40, 40'), for said first pin (31) to fit therein.

6. The articulated joint as claimed in claim 5, wherein said first pin (31) comprises a cylindrical threaded portion (37), insertable into a corresponding through hole (30) and configured to be screwed into respective mating threads formed on the blind holes (35, 36, 36').

7. The articulated joint as claimed in claim 6, wherein said first pin (31) comprises a knob-shaped portion (38), which is adapted to be grasped by a user to facilitate insertion or removal of the cylindrical portion (37) into and out of the seat (32) and to screw the knob-shaped portion into and out of the blind holes (35, 36, 36').

8. The articulated joint as claimed in claim 5, wherein said first pin (31) comprises an intermediate threaded portion (37), which is designed to be screwed into a corresponding matingly-threaded through hole (30') formed in said plate (25) and an end portion, which is designed to fit into a respective seat defined by said blind holes (35, 36, 36').

9. The articulated joint as claimed in claim 8, wherein said end portion of said first pin (31) and said blind holes (35, 36, 36') are tapered.

10. The articulated joint as claimed in claim 1, wherein an elongated hole (41) is formed on said at least one plate-shaped member (25), which extends along a corresponding third circular arc ($C_3$) centered on said transverse axis (T), said elongated hole (41) being adapted to slidingly engage a second pin (42) anchored to said fixed tubular body (2) for maintaining said two bodies (2, 3) coupled during removal of said first pin (31) from said at least one seat (32).

11. The articulated joint as claimed in claim 10, wherein said third circular arc ($C_3$) has a third radius ($R_3$) having a smaller value than a value of said second radiuses ($R_2'$).

12. The articulated joint as claimed in claim 2, wherein said at least one plate-shaped member (25) comprises a pair of substantially identical plate-shaped members (25), which are fixed to said movable tubular body (3) on opposite sides and in symmetrical positions relative to said common curvature plane ($\pi$), said fixed tubular body (2) having a pair of seats (32) formed on opposite sides and in symmetrical positions with respect to said common curvature plane ($\pi$) for insertion of corresponding first pins (31).

13. The articulated joint as claimed in claim 1, wherein said adjustment system (24) allow an inclination angle ($\beta$) of the movable tubular body (3) to be varied relative to a horizontal line between a minimum value comprised between 10° and 50° and a maximum value comprised between 15° and 45°.

* * * * *